United States Patent
Nessler et al.

(10) Patent No.: US 12,254,776 B2
(45) Date of Patent: Mar. 18, 2025

(54) CONTROL SYSTEM OF VEHICLE

(71) Applicant: Honda Motor Co., Ltd., Tokyo (JP)

(72) Inventors: Jens Nessler, Offenbach/Am Main (DE); Marcus Kleinehagenbrock, Offenbach/Am Main (DE); Robert Kastner, Frankfurt (DE)

(73) Assignee: Honda Motor Co., Ltd., Tokyo (JP)

( * ) Notice: Subject to any disclaimer, the term of this patent is extended or adjusted under 35 U.S.C. 154(b) by 295 days.

(21) Appl. No.: 17/986,903

(22) Filed: Nov. 15, 2022

(65) Prior Publication Data
US 2023/0260405 A1 Aug. 17, 2023

(30) Foreign Application Priority Data
Feb. 14, 2022 (CN) .......................... 202210132822.X

(51) Int. Cl.
*G08G 1/00* (2006.01)
*B60L 53/66* (2019.01)
*G06Q 10/02* (2012.01)

(52) U.S. Cl.
CPC .............. *G08G 1/22* (2013.01); *B60L 53/665* (2019.02); *G06Q 10/02* (2013.01); *B60L 2240/60* (2013.01); *B60L 2240/70* (2013.01)

(58) Field of Classification Search
CPC ........ G08G 1/22; G06Q 10/02; B60L 53/665; B60L 2240/60; B60L 2240/70
See application file for complete search history.

(56) References Cited

U.S. PATENT DOCUMENTS

2022/0147902 A1* 5/2022 Inagaki .................... G08G 1/22

* cited by examiner

*Primary Examiner* — Huan Le
(74) *Attorney, Agent, or Firm* — JCIPRNET

(57) ABSTRACT

A control system of a vehicle is provided. The control system includes a travelling plan database, stored with a future first travelling plan of a first vehicle and future second travelling plans of second vehicles, and disclosing the first and second travelling plans to a third party; a long distance communication unit; and a control unit. The control unit includes a matching component, querying the second vehicle that can be matched with the first vehicle to travel together on a specified road section with reference to travelling plans stored in the travelling plan database to compile a reservation table accordingly, and allowing a creator of the first travelling plan to perform platooning control on the specified road section according to the reservation table; and a pairing component, connecting the matched first vehicle and second vehicle through the long distance communication unit, so that the platooning control can be performed.

14 Claims, 11 Drawing Sheets

CONTROL SYSTEM OF VEHICLE

CROSS-REFERENCE TO RELATED APPLICATION

This application claims the priority of China patent application serial no. 202210132822.X, filed on Feb. 14, 2022. The entirety of the above-mentioned patent application is hereby incorporated by reference herein and made a part of this specification.

BACKGROUND

Technical Field

The disclosure relates to a vehicle control technology, and particularly relates to a control system of a vehicle that performs platooning control of the vehicle on a specified road section according to a predetermined travelling plan.

Description of Related Art

As the world pays attention to green energy issues and issues related to environmental protection, the low-emission or even zero-emission electric vehicle industry will be the focus of future transportation equipment development. On the other hand, how to satisfy the requirement of massive charging is a major topic of research for persons skilled in the art.

There is a method for platooning control with a large vehicle (for example, a truck, a bus, a cargo vehicle, etc.) travelling together on a specified road section is disclosed. The platooning control is a technology that allows multiple vehicles to follow the preceding vehicle while maintaining relative locations to one another. When a vehicle implements platooning control on a specified road section (for example, a highway), the vehicle can closely follow the preceding vehicle. In addition, there is a method for charging the own vehicle through a large vehicle travelling together is also disclosed.

When the driver of the own vehicle needs to be paired with a large vehicle for platooning control, the driver may communicate with a back-end system. The back-end system provides information related to the large vehicle that happens to be close to the own vehicle at this time to the driver of the own vehicle, so that the two vehicles can travel together for platooning control. However, the large vehicle closest to the own vehicle at this time may be too far away from the own vehicle to meet on a specified road section in time such that establishing a pairing becomes meaningless.

In view of the above, the disclosure provides a control system of a vehicle, which can arrange in advance a suitable large vehicle to travel together with the own vehicle on a specified road section during a process of a trip through a predetermined travelling plan and perform platooning control.

SUMMARY

The disclosure provides a control system of a vehicle, which includes a travelling plan database, stored with a future first travelling plan of a first vehicle and multiple future second travelling plans of multiple second vehicles, and disclosing the first travelling plan and the second travelling plans to a third party, and the first travelling plan and the second travelling plans respectively including a travelling date, a travelling time, and a travelling route; a long distance communication unit; and a control unit, coupled to the travelling plan database and the long distance communication unit. The control unit includes a matching component, querying the second vehicle that can be matched with the first vehicle to travel together on a specified road section with reference to travelling plans stored in the travelling plan database to compile a reservation table accordingly, and allowing a creator of the first travelling plan to perform platooning control on the specified road section according to the reservation table; and a pairing component, connecting the matched first vehicle and second vehicle through the long distance communication unit, so that the platooning control can be performed.

Furthermore, in the disclosure, the first vehicle includes a vehicle-to-vehicle power receiving device, and the second vehicle includes a vehicle-to-vehicle power supplying device. When performing the platooning control, through connecting the vehicle-to-vehicle power receiving device and the vehicle-to-vehicle power supplying device, the second vehicle supplies power to the first vehicle.

Furthermore, in the disclosure, the control unit includes a calculation component, calculating a reward for the second vehicle supplying power when performing the platooning control, and providing the reward to a driver of the second vehicle.

Furthermore, in the disclosure, the matching component respectively compares the first travelling plan with the second travelling plans to obtain a common road section between the first vehicle and the matched second vehicle.

Furthermore, in the disclosure, the matching component predicts an earliest time and a latest time for the first vehicle to reach a starting point of the common road section according to a driving preference of the first vehicle, and predicts a ready time for the second vehicle to reach the starting point of the common road section.

Furthermore, in the disclosure, when the ready time is between the earliest time and the latest time, the matching component associates information of the second vehicle with the common road section and adds the information to the reservation table indicating that the second vehicle can travel together with the first vehicle.

Furthermore, in the disclosure, when the ready time is earlier than the earliest time or later than the latest time, the matching component predicts a meeting location where the first vehicle and the second vehicle meet in a case of accelerating pursuit, and compares the meeting location with an end point of the common road section. When the meeting location is located before the end point of the common road section and a connecting road section between the meeting location and the end point of the common road section is greater than or equal to a predetermined length, the matching component associates information of the second vehicle with the common road section and adds the information to the reservation table.

Furthermore, in the disclosure, after the first vehicle starts travelling on a day of a trip, the matching component transmits matching information of the second vehicle to be matched to the first vehicle according to the reservation table. The matching information includes the starting point of the common road section, the end point of the common road section, the earliest time, the latest time, and the ready time with respect to the second vehicle to be matched. The first vehicle judges whether the common road section is reached according to the matching information. When the common road section is reached, the first vehicle executes a common road section operation to perform the platooning control. When the common road section is not reached, the first vehicle executes a vehicle speed adjustment operation for accelerating or decelerating an own vehicle.

Furthermore, in the disclosure, when executing the common road section operation, the matching component transmits a predicted meeting location where the first vehicle and the second vehicle meet to the first vehicle, and the first vehicle compares the meeting location with the end point of the common road section. When the meeting location is located before the end point of the common road section and a connecting road section between the meeting location and the end point of the common road section is greater than or equal to a predetermined length, the first vehicle sets a vehicle speed according to the meeting location.

Furthermore, in the disclosure, when executing the common road section operation, when the connecting road section is not greater than the predetermined length, the first vehicle temporarily adjusts the vehicle speed to lengthen the connecting road section, and transmits an adjusted vehicle speed to the matching component.

Furthermore, in the disclosure, when executing the common road section operation, the first vehicle makes a request to extend the connecting road section according to a state of charge thereof.

Furthermore, in the disclosure, the reservation table includes information of multiple second vehicles matched with the first vehicle and respective common road sections. The matching component transmits the reservation table to a driver of the first vehicle to receive a reply to confirm whether the reservation table is established.

Furthermore, in the disclosure, in a case where the reservation table is established, when the travelling plan database receives a new second travelling plan having a new common road section with the first travelling plan, the matching component updates the reservation table according to the new second travelling plan.

Furthermore, in the disclosure, in a case where the reservation table is established, when the matching component is notified through the long distance communication unit that the first vehicle or the second vehicle associated with the reservation table cannot comply with a pairing appointment, the matching component re-compiles the reservation table with reference to the travelling plans stored in the travelling plan database.

Furthermore, in the disclosure, in a case where the reservation table is established, when the first vehicle or the second vehicle suddenly cancels a pairing appointment, the calculation component calculates a penalty for the first vehicle or the second vehicle cancelling the appointment to impose the penalty on a corresponding driver.

Based on the above, the control system of the vehicle of the disclosure can arrange in advance the pairing (charging) appointment to avoid a case of not being able to meet on the specified road section. The own vehicle can maximize the time for the platooning control with multiple large vehicles. The large vehicle can maximize charging services to increase the income. In this way, a long-term and stable pairing (charging) appointment can provide the most planning reliability for the drivers of both vehicles and provide the most profit potential for the back-end system.

In order for the features and advantages of the disclosure to be more comprehensible, the following specific embodiments are described in detail in conjunction with the drawings.

DETAILED DESCRIPTION OF DISCLOSED EMBODIMENTS

Figure 1:
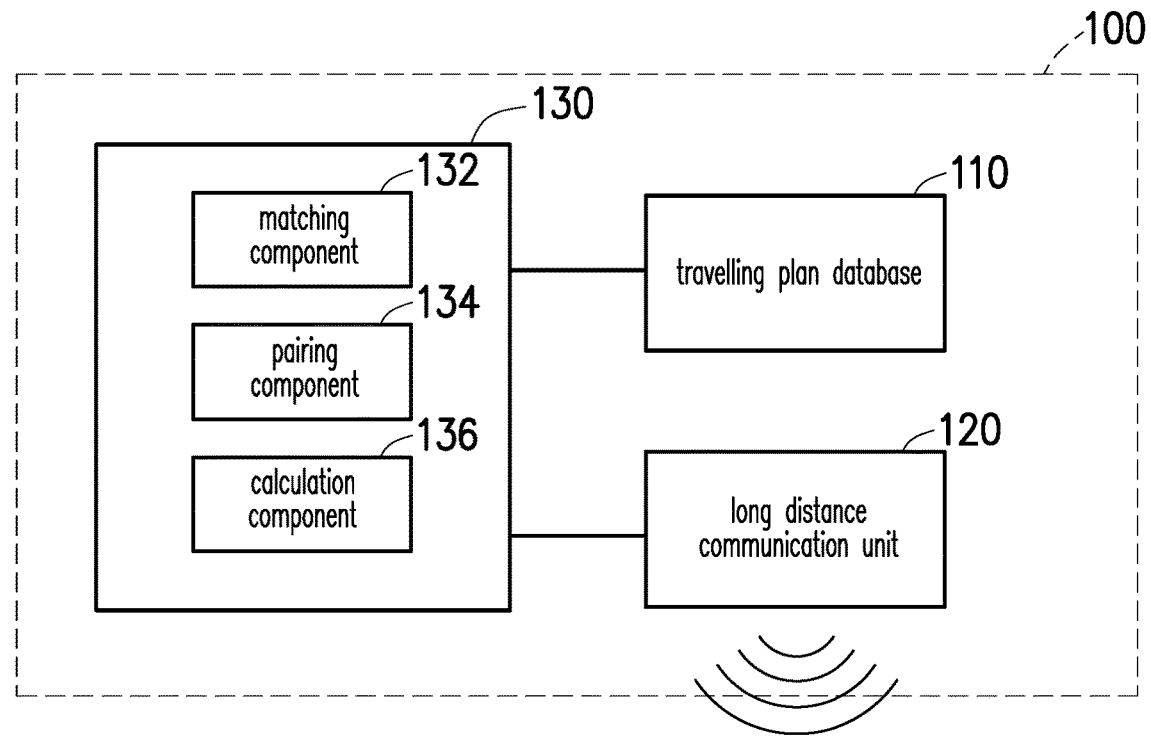
FIG. 1 is a schematic block diagram of a control system of a vehicle according to an embodiment of the disclosure.
Figure 1:
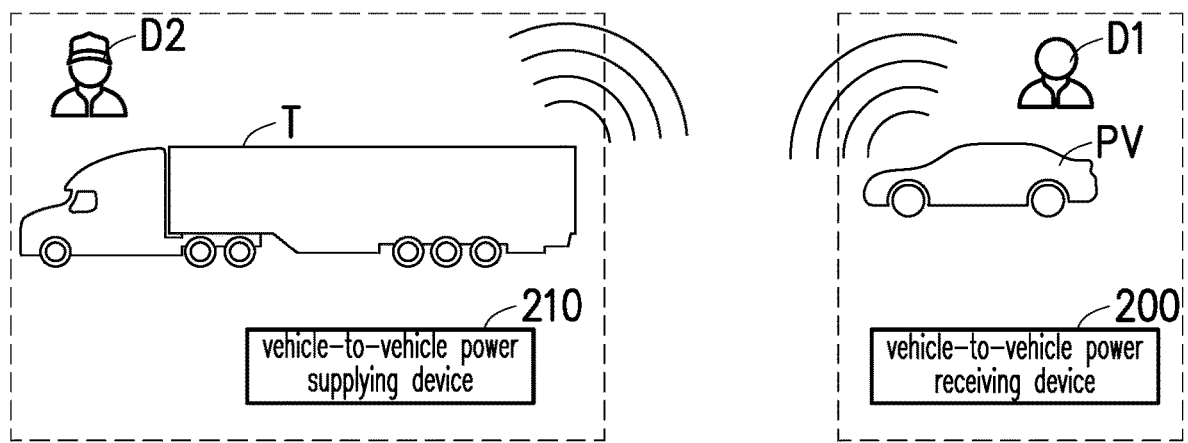

Reference will now be made in detail to the exemplary embodiments of the disclosure, and examples of the exemplary embodiments are illustrated in the drawings. Wherever possible, the same reference numerals are used in the drawings and description to refer to the same or similar parts.

FIG. 1 is a schematic block diagram of a control system of a vehicle according to an embodiment of the disclosure. Please refer to FIG. 1, a control system 100 of the embodiment is, for example, a back-end server, which includes a travelling plan database 110, a long distance communication unit 120, and a control unit 130.

The travelling plan database 110 is, for example, any type of fixed or removable random access memory (RAM), read-only memory (ROM), flash memory, hard disk, other similar devices and integrated circuits, or a combination thereof. The travelling plan database 110 is used to store a future first travelling plan of a first vehicle PV and multiple future second travelling plans of multiple second vehicles T. The first travelling plan includes a travelling date, a travelling time, and a travelling route of the first vehicle PV. The second travelling plan includes a travelling date, a travelling time, and a travelling route of the second vehicle T. In addition, the travelling plan database 110 may also disclose the first travelling plan and the second travelling plan to a third party.

The first vehicle PV is, for example, a small electric vehicle for personal use with an electric motor as a power source. The second vehicle T is, for example, a large electric truck or cargo vehicle for commercial use with an electric motor as a power source. The electric vehicle is, for example, driven using electric power discharged from a battery such as a secondary battery, a hydrogen fuel cell, a metal fuel cell, and an alcohol fuel cell. The first vehicle PV includes a vehicle-to-vehicle power receiving device 200, the second vehicle T includes a vehicle-to-vehicle power supplying device 210, and the first vehicle PV and the second vehicle T both support the existing platooning control technology. When the first vehicle PV performs the platooning control on the second vehicle T, the first vehicle PV drives in a manner of maintaining a fixed distance and closely following the preceding second vehicle T, and the second vehicle T may supply power to the first vehicle PV through connecting the vehicle-to-vehicle power receiving device 200 and the vehicle-to-vehicle power supplying device 210. The vehicle-to-vehicle power receiving device 200 and the vehicle-to-vehicle power supplying device 210 are, for example, electronic elements or devices that can exchange and supplement electrical energy through a wired or wireless connection.

The long distance communication unit 120 is, for example, an electronic element or device capable of performing long distance wireless communication using communication technologies such as cellular network or vehicle-to-everything (V2X).

The control unit 130 is coupled to the travelling plan database 110 and the long distance communication unit 120. As shown in FIG. 1, the control unit 130 includes a matching component 132, a pairing component 134, and a calculation component 136. A part or all of the control unit 130 may be implemented through a processor executing a program (software). Moreover, a part or all of which may also be implemented by hardware such as a large scale integration (LSI) circuit or an application specific integrated circuit (ASIC), or through a combination of software and hardware.

In the embodiment, drivers D2 of multiple second vehicles T cooperating with the control system 100 need to register or log in personal data (including names, images/avatars, etc.) and driving preferences in the control system 100 first, and provide the future second travelling plans to the control system 100. The second travelling plan is recorded with the travelling date, the travelling time, and the travelling route for which a service can be provided.

In addition, the driver D1 of the first vehicle PV who intends to use the control system 100 to supplement electric power during a process of a future trip also needs to register or log in personal data (including a name, an image/avatar, etc.) and driving preferences in the control system 100 first, and provide the first travelling plan of the future trip to the control system 100. The first travelling plan is recorded with the travelling date, the travelling time, and the travelling route of the future trip.

The matching component 132 may query the second vehicle T that can be matched with the first vehicle PV to travel together on a specified road section with reference to the travelling plans stored in the travelling plan database 110 to compile a reservation table accordingly. Specifically, the matching component 132 may respectively compare the first travelling plan with the stored second travelling plans to obtain a common road section between the first vehicle PV and the matched second vehicle T, so as to compile the reservation table using the travelling times.

In addition, the matching component 132 may allow a creator of the first travelling plan (usually the driver D1 of the first vehicle PV) to perform platooning control with the second vehicle T on the specified road section according to the reservation table.

In addition, in a case where the reservation table is established, when the travelling plan database 110 is stored with a new second travelling plan having a new common road section with the first travelling plan, the matching component 132 may update the reservation table according to the new second travelling plan.

Therefore, the pairing component 134 may connect the matched first vehicle PV and second vehicle T during the process of the trip through the long distance communication unit 120 to perform the platooning control on the common road section, so as to complete exchange or supplementation of electrical energy.

In the specification, the term "connection" refers to, for example, an action of transmitting information to each other using wireless communication technology, so that the first vehicle PV may perform the platooning control on the second vehicle T.

In addition, the driving preferences of the driver D1 may include, for example, one or more of a minimum average speed of the paired second vehicle T, whether a vehicle-to-vehicle power receiving device is equipped, a maximum acceptable price per kilowatt, an expected state of charge at an end of a trip itinerary, a maximum acceptable delay/detour to achieve the expected state of charge, whether an automatic charging request may be issued based on the trip itinerary/the expected state of charge, a maximum recharge mileage (may be derived from a model of a vehicle) of a battery of the vehicle, a maximum acceptable distance to the second vehicle T, a maximum speed of pursuing a preceding vehicle, a minimum speed of allowing a following vehicle to catch up, a route preference (consideration factors include cheap, fast, energy saving, charging time, etc.), and a reliability score calculated according to a rate of the vehicle complying with pairing appointments, an average delay (too late/too early), a rate of cancelling the pairing appointments, an average ahead time of cancelling the pairing appointments, etc.

The driving preferences of the driver D2 may include, for example, one or more of an average/maximum travelling speed on a specified route (a default value for a route that has not been traveled may be predicted according to a previous travelling manner), a required service price per kilowatt, whether supplying power is accepted while pairing, and a required reliability score for the vehicle travelling together.

The following is an example to illustrate a compilation manner of the reservation table. It is assumed that on June 4, the driver D1 of the first vehicle PV decides to visit a friend who lives in another city 206 kilometers away from the residence of the driver D1 on June 13, 9 days later. Due to the need for supplementary electric power, the driver D1 of the first vehicle PV may log in the travelling plan for the trip as shown in Table 1 below in the control system 100 through a personal computer at home.

TABLE 1

Date: Friday, June 13
Latest arrival time: 18:00
Starting location: address of the driver D1 of the first vehicle PV
Destination: address of the friend in another city
Travelling route: automatic planning
Number of breaks: 0
Estimated initial state of charge (SOC) of battery at start of travelling: 50%

A few seconds after completing the login, a response from the control system 100 is received on the personal computer of the driver D1 of the first vehicle PV. The response includes the reservation table compiled by the matching component 132 according to previously transmitted preferences (for example, choosing as many pairs as possible, preferred travelling speed, etc.) of the driver D1 as shown in Table 2 below. The reservation table includes information of multiple second vehicles T matched with the first vehicle PV and respective common road sections. The matching component 132 transmits the reservation table to the driver D1 of the first vehicle PV to receive a reply to confirm whether the reservation table is established.

TABLE 2

Recommended starting time of travelling: 14:34
Predicted time of trip: 3 hours 17 minutes
Price (including pairing/charging): EUR 12.65
Each stage of trip is as listed below:

| Stage | Time | Kilometer | Vehicle travelling together (Second vehicle) | Charging |
|---|---|---|---|---|
| 1 | 14:34-15:08 | 0-32 | | |
| 2 | 15:08-15:45 | 32-80 | Truck No. 1 | No |
| 3 | 15:45-16:09 | 80-117 | Bus No. 1 | Yes |
| 4 | 16:09-16:52 | 117-62 | | |
| 5 | 16:52-17:20 | — | Parked at charging station | Yes |
| 6 | 17:20-17:51 | 162-206 | | |
| | | Possibility of upgrade: high | | |

If the driver D1 of the first vehicle PV agrees to the arrangement of the reservation table, the establishment of the reservation table may be confirmed through the personal computer. If the driver D1 of the first vehicle PV does not agree to the arrangement of the reservation table, the driver D1 may also choose to reject any pairing/charging vehicle travelling together (the second vehicle T), and let the control system 100 re-compile the reservation table.

In a case where the reservation table is established, on June 7, 3 days later, when the travelling plan database 110 receives the travelling plan of a new vehicle (Truck No. 2) traveling together having a new common road section with the travelling plan of the first vehicle PV, the matching component 132 may update the reservation table according to the new traveling plan of the vehicle travelling together to provide a more suitable arrangement. In order to notify the driver D1 of the first vehicle PV in time, the matching component 132 may transmit the updated reservation table as shown in Table 3 below to a smartphone of the driver D1 of the first vehicle PV to receive a reply to confirm whether the updated reservation table is established. Compared with the reservation table in Table 2, the reservation table in Table 3 has one more vehicle travelling together (Truck No. 2) that may assist in charging, so that the arrangement for Stage 4 to Stage 6 are different, and the predicted time of trip and the possibility of upgrade are reduced, but the required price is increased.

TABLE 3

Recommended starting time of travelling: 14:34
Predicted time of trip: 2 hours 49 minutes
Price (including pairing/charging): EUR 14.75
Each stage of trip is as listed below:

| Stage | Time | Kilometer | Vehicle travelling together (Second vehicle) | Charging |
|---|---|---|---|---|
| 1 | 14:34-15:08 | 0-32 | | |
| 2 | 15:08-15:45 | 32-80 | Truck No. 1 | No |
| 3 | 15:45-16:09 | 80-117 | Bus No. 1 | Yes |
| 4 | 16:09-16:16 | 117-131 | | |
| 5 | 16:16-16:55 | 131-179 | Truck No. 2 | Yes |
| 6 | 16:55-17:23 | 179-206 | | |
| | | Possibility of upgrade: low | | |

If the driver D1 of the first vehicle PV agrees to the arrangement of the updated reservation table, the establishment of the updated reservation table may be confirmed through the smartphone. If the driver D1 of the first vehicle PV does not agree to the arrangement of the updated reservation table, the driver D1 may also choose to refuse to update the reservation table and keep the original reservation table.

In this way, the driver D1 of the first vehicle PV may sequentially supplement electric power through multiple vehicles travelling together during the trip itinerary on June 13 according to the established reservation table, and reach the residence of the friend smoothly.

Similarly, the driver D1 of the first vehicle PV may also arrange a return trip in a same manner.

In an embodiment, the matching component 132 of the control system 100 may consider the capacity and the state of charge (SOC) of the battery of the first vehicle PV in order to choose the correct number of second vehicles T equipped with the vehicle-to-vehicle power supplying device 210, so that the first vehicle PV does not require (or at least minimize) parking at the charging station. Additionally, in order for the first vehicle PV to achieve the required state of charge at the end of the trip itinerary, the matching component 132 of the control system 100 may recommend changing the original travelling route of the first vehicle PV. The control system 100 may choose a route that requires a detour, but can allow a longer charging time (for example, choose a route to travel together with an additional second vehicle T).

If the first vehicle PV has different route choices, the control system 100 may find an optimal route through the driving preferences of the first vehicle PV. In order to obtain the most energy saving efficiency, the energy consumption of the first vehicle PV may, for example, consider factors such as the energy required to meet the second vehicle T, the distance of travelling in pairs (not travelling in pairs), the optimal operating point of a motor of the first vehicle PV, road slope, traffic conditions, wind resistance of the first vehicle PV, and current wind speed and direction.

The control system 100 may optimize the route of the first vehicle PV even if the first vehicle PV is already on the road. For example, there is a preferred vehicle that may be paired to travel together, an unexpected event (for example, a traffic jam) occurs, the state of charge of the first vehicle PV is not the same as expected (that is, higher or lower than expected), etc.

In addition, the control system 100 may also arrange for the first vehicle PV to be paired with the slow second vehicle T that can supplement electric power first until the state of charge (SOC) of the first vehicle PV is high enough to complete the trip itinerary, and then paired with the faster second vehicle T without the supplementary electric power function, thereby benefiting from the slipstream effect to reduce the energy consumption and shorten the time of the trip.

In an embodiment, in a case where the reservation table is established, when the matching component 132 is notified through the long distance communication unit 120 that the first vehicle PV or the second vehicle T associated with the reservation table cannot comply with the pairing appointment, the matching component 132 may re-compile the reservation table with reference to the travelling plans stored in the travelling plan database 110.

For example, the control system 100 may (automatically) consider dynamically re-compiling the reservation table in the following cases: (1) due to the own mistake of the driver or a force majeure event (for example, an accident), the driver D2 of the second vehicle T is no longer able to or does not intend to continue complying with the pairing appointment; (2) a preferred arrangement (for example, longer pairing and/or charging time, etc.) can be provided for the first vehicle PV and the second vehicle T; (3) the drivers D1 and D2 both still intend to comply with the pairing appointment, but due to any reason (for example, starting too late, detour, sudden traffic jam or accident, etc.), a connecting road section that is expected to travel together is too short (for example, less than 10 or 20 km or less than a quarter of the originally predicted distance); (4) the driver D1 of the first vehicle PV suddenly determines an (unplanned) additional charging requirement during the process of the current trip, and notifies the control system 100 of the additional charging requirement.

In a case of dynamically re-compiling the reservation table, it may be necessary to ask the driver of the affected vehicle whether to agree to change the current pairing appointment, which may be completed through transmitting a re-compiled reservation table similar to asking the driver if the driver accepts a re-paired vehicle travelling together (charging buddy). In addition, an option to automatically accept an alternative or preferred pairing or not to agree to re-arrangement of a particular pairing or trip itinerary may also be provided in the driving preferences.

The following embodiments are used to respectively describe a method for providing the travelling plans to the control system 100 by the drivers D1 and D2 of the first vehicle PV and the second vehicle T.

Figure 2:
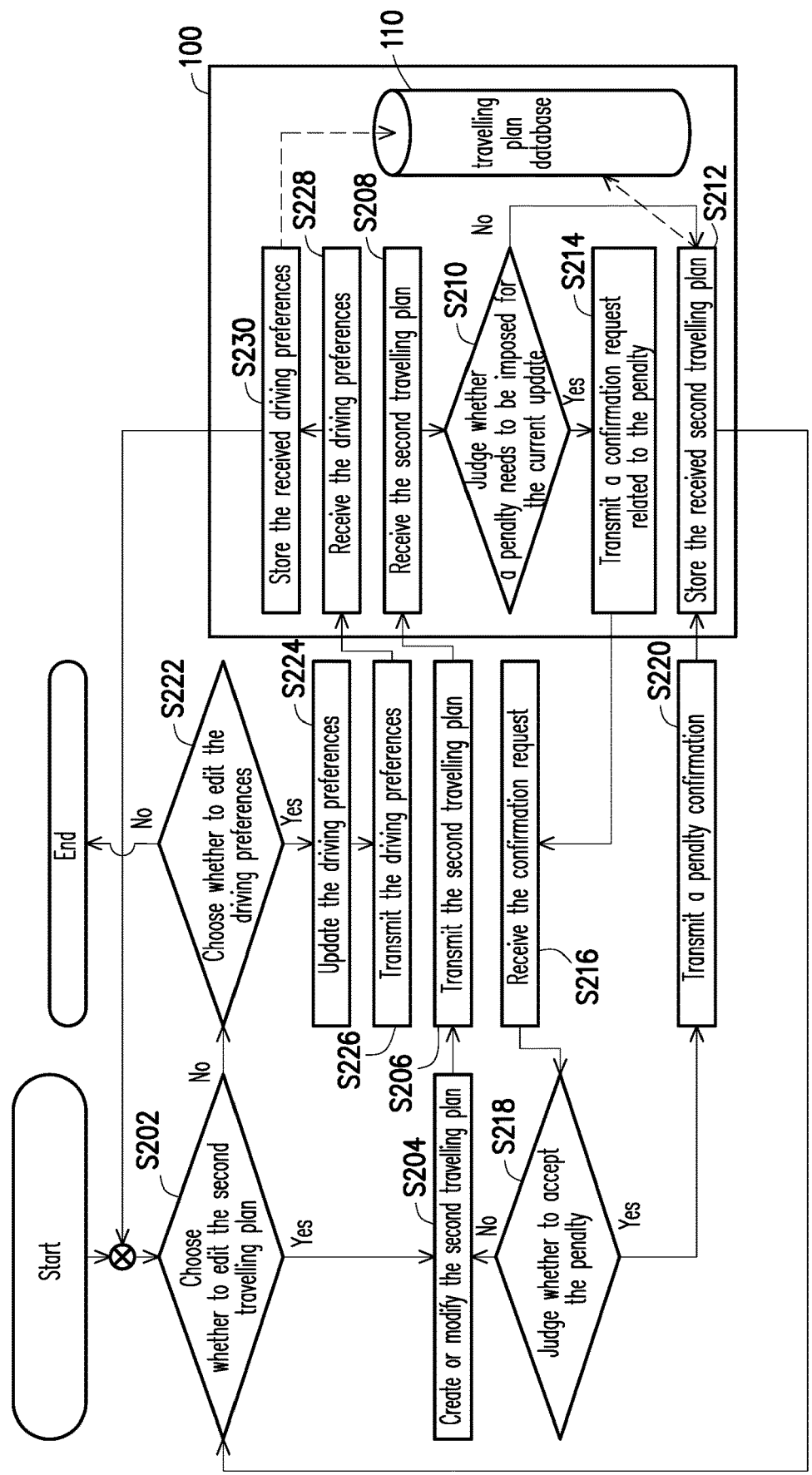
FIG. 2 is a flowchart of steps of a method for providing a second travelling plan according to an embodiment of the disclosure.

FIG. 2 is a flowchart of steps of a method for providing a second travelling plan according to an embodiment of the disclosure. Please refer to FIG. 2. The driver D2 of the second vehicle T may use a personal computer or a mobile terminal to execute a specific application program (app) to start the steps of the embodiment.

First, in Step S202, the driver D2 chooses whether to edit the second travelling plan. If yes, the driver D2 creates or modifies the second travelling plan in Step S204, and then transmits the second travelling plan to the control system 100 in Step S206.

In Step S208, the control system 100 receives the second travelling plan. Next, in Step S210, the control system 100 judges whether a penalty needs to be imposed for the update of the current travelling plan. If not, in Step S212, the received second travelling plan is stored to the travelling plan database 110, and then return to Step S202 to continue the process.

In Step S210, for example, in a case where the original reservation table has already been established, when the driver D2 of the second vehicle T suddenly cancels the pairing appointment and intends to update the second travelling plan, the control system 100 may judge that the penalty needs to be imposed, and the calculation component 136 calculates the penalty for canceling the pairing appointment of the second vehicle T to impose the penalty on the driver D2. It is beneficial to incentivize the driver D2 to comply with the reservation table through imposing (moderate) penalties to improve the reliability of the overall system.

For example, a fine may be charged to the driver D2 of the second vehicle T as the penalty in the following cases: (1) the pairing appointment is suddenly cancelled and the control system 100 cannot provide other alternative vehicles; (2) due to the own mistake (for example, starting too early and not pausing, or starting too late and not catching up) of the driver, the pairing appointment cannot be complied and the control system 100 cannot provide other alternative vehicles. If the driver D2 encounters an unexpected traffic jam, road closure, accident, etc., the same does not count as being unable to comply with the pairing appointment due to the own mistake. The penalty calculated by the calculation component 136 should be moderate, thereby incentivizing the driver to comply with the pairing appointment or to cancel the pairing appointment sufficiently early.

In an embodiment, the calculation component 136 may also calculate a reward (fee) for the second vehicle T for supplying power when performing the platooning control, and provide the reward to the driver D2 of the second vehicle T.

After calculating the penalty, in Step S214, the control system 100 transmits a confirmation request related to the penalty to the driver D2. Next, in Step S216, the driver D2 receives the confirmation request, and in Step S218, the driver D2 judges whether to accept the penalty. If yes, in Step S220, a penalty confirmation is transmitted to the control system 100, and then in Step S212, the control system 100 stores the received second travelling plan to the travelling plan database 110. If not, return to Step S204 to re-create or modify the second travelling plan.

On the other hand, if the driver D2 chooses not to edit the second travelling plan in Step S202, the driver D2 chooses whether to edit the driving preferences in Step S222. If yes, the driving preferences are updated in Step S224, and then in Step S226, the driving preferences are transmitted to the control system 100. Next, in Step S228, the control system 100 receives the driving preferences, and in Step S230, the control system 100 stores the received driving preferences to the travelling plan database 110. Next, return to Step S202 to continue the process.

If the driver D2 chooses not to edit the driving preferences in Step S222, the method ends.

Figure 3:
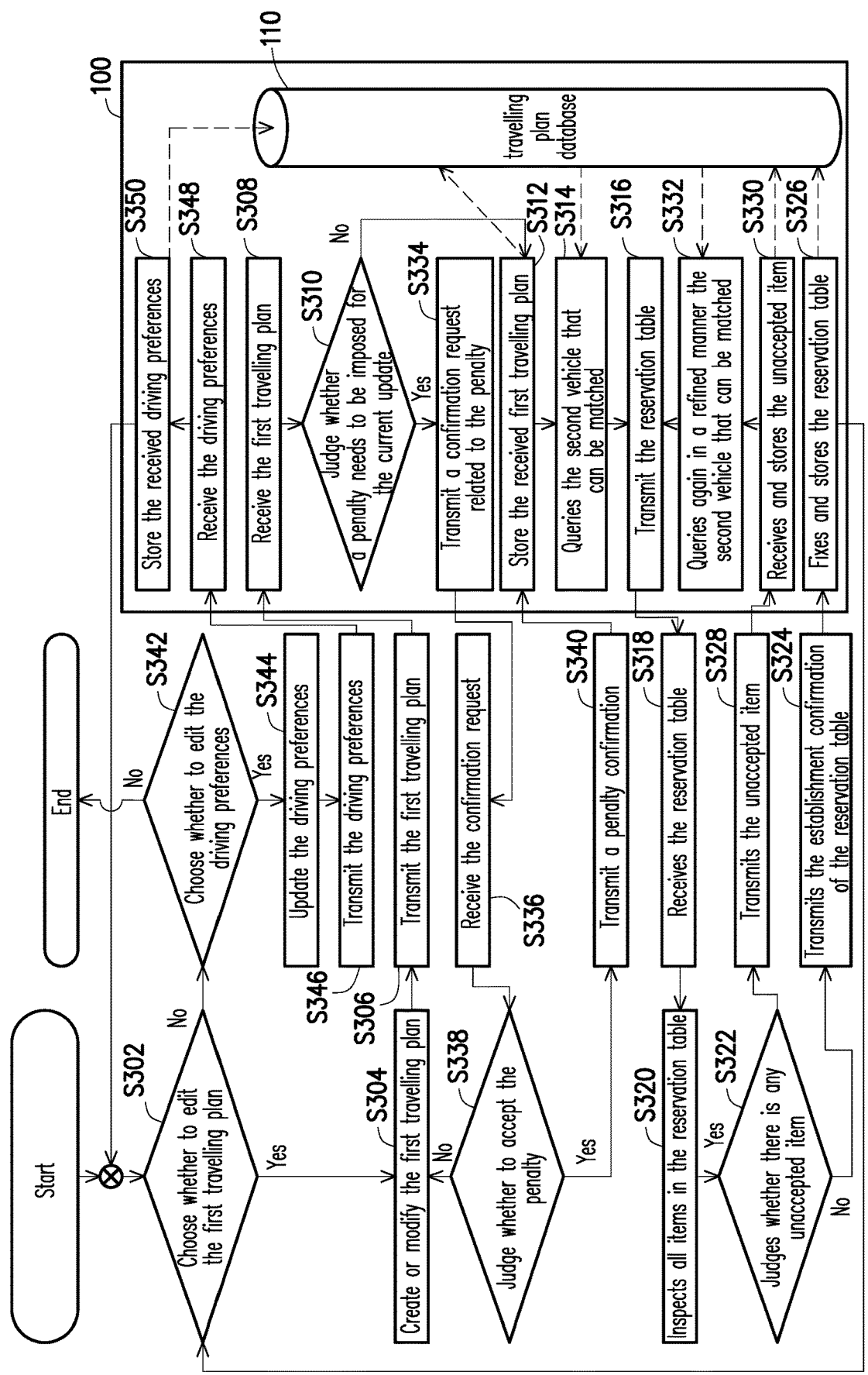
FIG. 3 is a flowchart of steps of a method for providing a first travelling plan according to an embodiment of the disclosure.

FIG. 3 is a flowchart of steps of a method for providing a first travelling plan according to an embodiment of the disclosure. Please refer to FIG. 3. The driver D1 of the first vehicle PV may use the personal computer or a mobile terminal to execute a specific application program (app) to start the steps of the embodiment.

First, in Step S302, the driver D1 chooses whether to edit the first travelling plan. If yes, the driver D1 creates or modifies the first travelling plan in Step S304, and then transmits the first travelling plan to the control system 100 in Step S306.

In Step S308, the control system 100 receives the first travelling plan. Next, in Step S310, the control system 100 judges whether a penalty needs to be imposed for the update of the current travelling plan. If not, in Step S312, the received first travelling plan is stored to the travelling plan database 110, and then in Step S314, the matching component 132 queries the second vehicle T that can be matched with the first vehicle PV to compile the reservation table accordingly.

Next, the matching component 132 transmits the reservation table to the driver D1 in Step S316, and the driver D1 receives the reservation table in Step S318. Next, in Step S320, the driver D1 inspects all items in the reservation table, and in Step S322, the driver D1 judges whether there is any unaccepted item. If not, in Step S324, the establishment confirmation of the reservation table is transmitted to the control system 100, then in Step S326, the matching component 132 fixes the reservation table, and stores the reservation table to the travelling plan database 110, and then return to Step S302 to continue the process. If yes, the unaccepted item is transmitted to the control system 100 in Step S328, and then the matching component 132 receives the unaccepted item in Step S330, and stores the unaccepted item to the travelling plan database 110. Next, in Step S332, the matching component 132 queries in a refined manner the second vehicle T that can be matched with the first vehicle PV again to re-compile the reservation table accordingly again. Next, return to Step S316 to transmit the reservation table to the driver D1 again.

If in Step S310, for example, in a case where the original reservation table has already been established, when the driver D1 of the first vehicle PV suddenly cancels the pairing appointment and intends to update the first travelling plan, the control system 100 judges that a penalty needs to be imposed, and the calculation component 136 calculates the penalty for canceling the pairing appointment of the first vehicle PV to apply the penalty to the driver D1. It is beneficial to incentivize the driver D1 to comply with the reservation table through imposing (moderate) penalties to improve the reliability of the overall system.

For example, a fine may be charged to the driver D1 of the first vehicle PV as the penalty in the following cases: (1) suddenly cancel the pairing appointment; (2) due to the own mistake (for example, starting too early and not pausing, or starting too late and not catching up) of the driver, the pairing appointment cannot be complied. Similarly, if the driver D1 encounters an unexpected traffic jam, road closure, accident, etc., the same does not count as being unable to comply with the pairing appointment due to the own mistake.

After calculating the penalty, in Step S334, the control system 100 transmits a confirmation request related to the penalty to the driver D1. Next, in Step S336, the driver D1 receives the confirmation request, and in Step S338, the driver D1 judges whether to accept the penalty. If yes, a penalty confirmation is transmitted to the control system 100 in Step S340, and then the control system 100 stores the received first travelling plan to the travelling plan database 110 in Step S312. If not, return to Step S304 to re-create or modify the first travelling plan.

On the other hand, if the driver D1 chooses not to edit the first travelling plan in Step S302, the driver D1 chooses whether to edit the driving preferences in Step S342. If yes, the driving preferences are updated in Step S344, and then the driving preferences are transmitted to the control system 100 in Step S346. Next, the control system 100 receives the driving preferences in Step S348, and the control system 100 stores the received driving preference to the travelling plan database 110 in Step S350. Next, return to Step S302 to continue the process.

If the driver D1 chooses not to edit the driving preferences in Step S342, the method ends.

Figure 4:
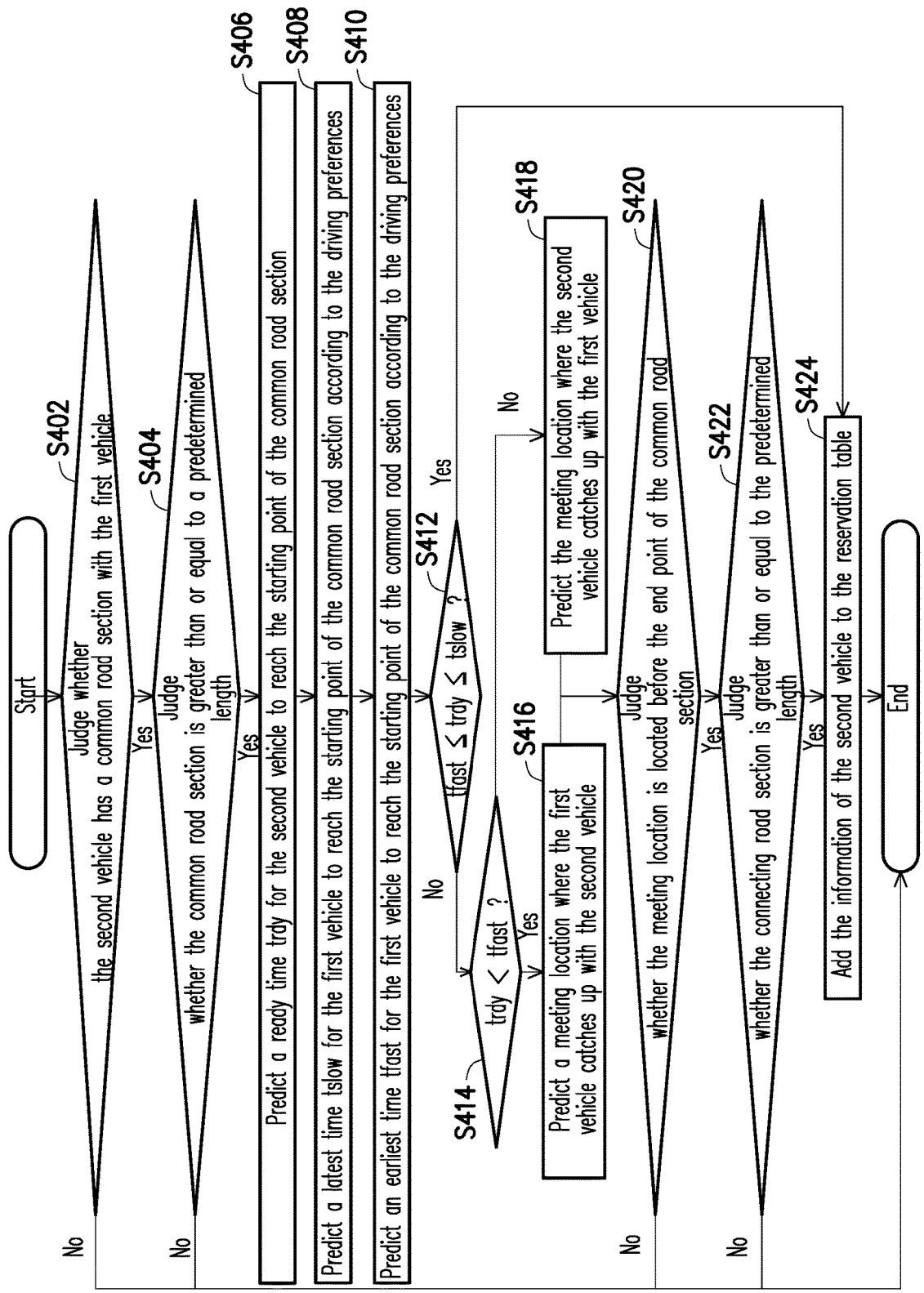
FIG. 4 is a flowchart of steps of querying and matching vehicles according to an embodiment of the disclosure.

The following embodiment is used to describe a method for compiling the reservation table. FIG. 4 is a flowchart of steps of querying and matching vehicles according to an embodiment of the disclosure. Please refer to FIG. 4. The matching component 132 of the control system 100 may query one by one multiple second vehicles T whose second travelling plans are stored to the travelling plan database 110.

First, in Step S402, the matching component 132 judges whether the second vehicle T has a common road section with the first vehicle PV. If not, the method ends to continue querying the next second vehicle T. If yes, in Step S404, the matching component 132 judges whether the common road section is greater than or equal to a predetermined length. The predetermined length of the common road section may be, for example, formulated depending on the driving preferences. If the common road section is not greater than or equal to the predetermined length, the method ends to continue querying the next second vehicle T.

If the common road section is greater than or equal to the predetermined length, in Step S406, the matching component 132 predicts a ready time trdy for the second vehicle T to reach the starting point of the common road section, and in Step S408, the matching component 132 predicts a latest time tslow for the first vehicle PV to reach the starting point of the common road section according to the driving preferences of the first vehicle PV. In Step S410, the matching component 132 predicts an earliest time tfast for the first vehicle PV to reach the starting point of the common road section according to the driving preferences of the first vehicle PV.

Next, in Step S412, the matching component 132 judges whether the ready time trdy is between the earliest time tfast and the latest time tslow. If not, in Step S414, the matching component 132 judges whether the ready time trdy is earlier than the earliest time tfast. If the ready time trdy is earlier than the earliest time tfast, the matching component 132 predicts a meeting location where the first vehicle PV catches up with the second vehicle T in Step S416. If the ready time trdy is not earlier than the earliest time tfast, in Step S418, the matching component 132 predicts the meeting location where the second vehicle T catches up with the first vehicle PV.

In detail, the matching component 132 may predict locations of the first vehicle PV and the second vehicle T as in the navigation developed by Google, regularly update traffic flow information related to each route, and consider events such as construction sites, detours, and speed limits. As such, the matching component 132 may estimate travelling speeds of the first vehicle PV and the second vehicle T for each part (for example, every 100 meters or every 10 meters) of the route, thereby predicting the ready time trdy for the second vehicle T to reach the starting point of the common road section and predicting the latest time tslow, the earliest time tfast, and the meeting location for the first vehicle PV to reach the starting point of the common road section according to the driving preferences of the first vehicle PV.

Next, in Step S420, the matching component 132 compares the meeting location with the end point of the common road section, and judges whether the meeting location is located before the end point of the common road section. If not, the method ends to continue querying the next second vehicle T. If yes, in Step S422, the matching component 132 judges whether the connecting road section between the meeting location and the end point of the common road section is greater than or equal to the predetermined length.

The predetermined length of the connecting road section may be, for example, formulated depending on the state of charge of the first vehicle PV. If the connecting road section is greater than or equal to the predetermined length, in Step S424, the information of the second vehicle T is associated with the common road section and added to the reservation table. In an embodiment, the second vehicle T firstly added to a candidate table. The routes of the candidates might overlap and therefore a subset of the candidates must be selected. Only the best (or at least a sufficiently good) subset of the second vehicles T with non-overlapping routes, that fulfills all requirements (preferences) and maximizes pairing time will be put into the reservation table. If the connecting road section is not greater than or equal to the predetermined length, the method ends to continue querying the next second vehicle T.

If in Step S412, the matching component 132 judges that the ready time trdy is between the earliest time tfast and the latest time tslow, directly proceed to Step S424 to associate the information of the second vehicle T with the common road section and add the information to the reservation table.

The following embodiment is used to describe a travelling operation on the day of the trip. The first vehicle PV and the second vehicle T are equipped with travelling control units. The travelling control unit is, for example, a central processing unit (CPU), other programmable general-purpose or specific-purpose microprocessors, digital signal processors (DSPs), programmable controllers, application specific integrated circuits (ASICs), other similar components, or a combination of the above components that may be used to assist the vehicle in controlling, notifying, and judging the driving operation.

Figure 5:
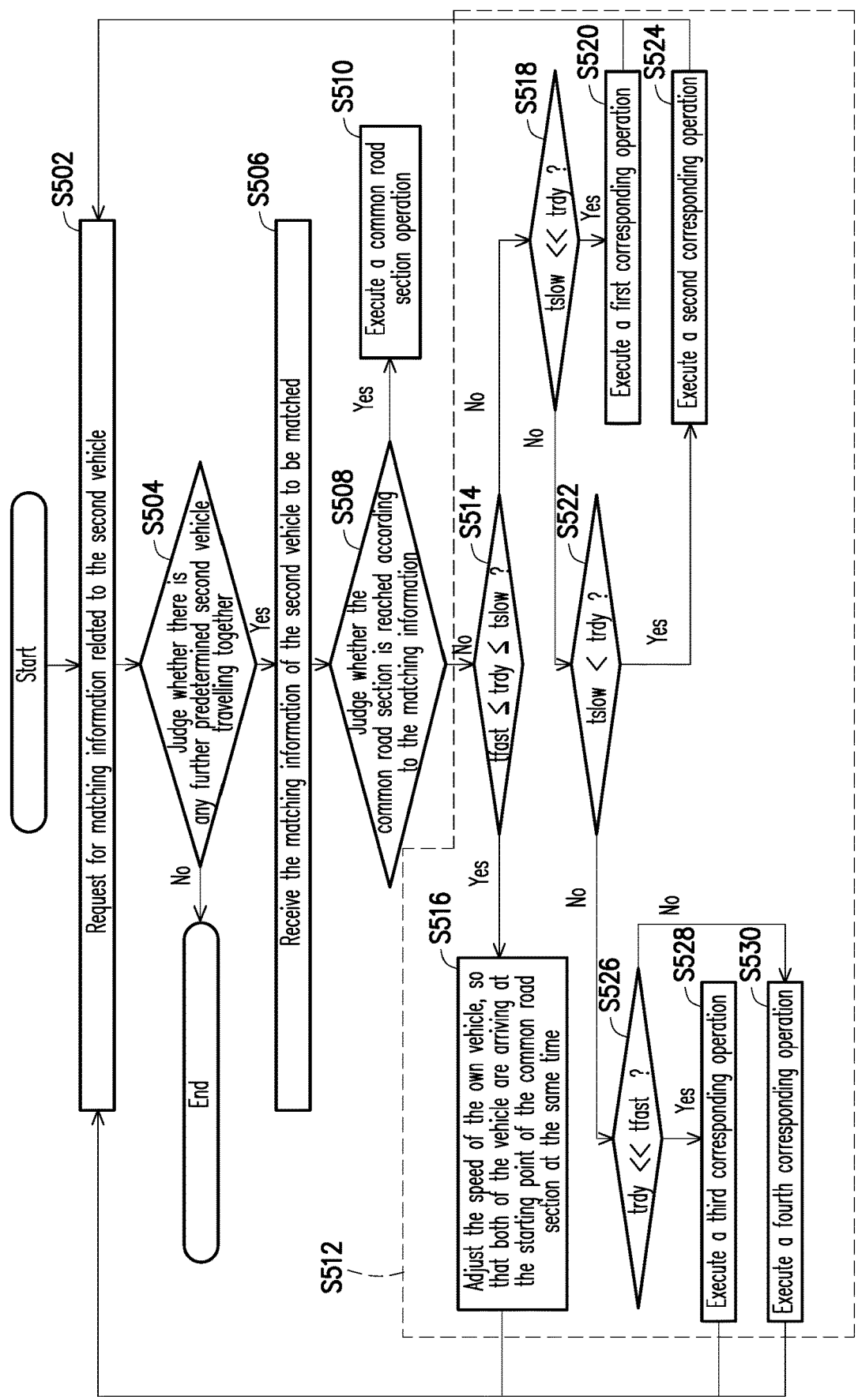
FIG. 5 is a flowchart of steps of a travelling operation on a day of a trip according to an embodiment of the disclosure.

FIG. 5 is a flowchart of steps of a travelling operation on a day of a trip according to an embodiment of the disclosure. Please refer to FIG. 5. After the first vehicle PV starts travelling on the day of the trip, in Step S502, the first vehicle PV requests the control system 100 for matching information related to the second vehicle T, and then in Step S504, the first vehicle PV judges whether there is any further predetermined second vehicle T travelling together. If not, the method ends. If yes, in Step S506, the first vehicle PV receives the matching information of the second vehicle T to be matched from the matching component 132 of the control system 100. The matching information includes the starting point of the common road section, the end point of the common road section, the earliest time tfast for the first vehicle PV to reach the starting point of the common road section, the latest time tslow for the first vehicle PV to reach the starting point of the common road section, and the ready time trdy for the second vehicle T to reach the common road section with respect to the second vehicle T to be matched.

Next, in Step S508, the first vehicle PV judges whether the common road section is reached according to the matching information. When the first vehicle PV has reached the common road section, in Step S510, the first vehicle PV executes a common road section operation to perform the platooning control, and then return to Step S502 to continue the process. Please refer to the following for the detailed description of the common road section operation.

When the first vehicle PV has not reached the common road section, in Step S512, the first vehicle PV executes a vehicle speed adjustment operation for accelerating and decelerating the own vehicle. Specifically, as shown in FIG. 5, Step S512 includes Steps S514 to S530. In Step S514, the first vehicle PV judges whether the ready time trdy is between the earliest time tfast and the latest time tslow. If yes, in Step S516, the first vehicle PV adjusts the speed of the own vehicle, so that the first vehicle PV and the second vehicle T to be matched are arriving at the starting point of the common road section at the same time (the first vehicle PV may automatically set the vehicle speed in an automated travelling mode, and the first vehicle PV may provide a suitable optimal speed to the driver in a manual travelling mode), and then return to Step S502 to continue the process. If not, in Step S518, the first vehicle PV judges whether the latest time tslow is much earlier than the ready time trdy.

If the latest time tslow is much earlier than the ready time trdy, in Step S520, the first vehicle PV executes a first corresponding operation, and then return to Step S502 to continue the process. If the latest time tslow is not much earlier than the ready time trdy, in Step S522, the first vehicle PV judges whether the latest time tslow is earlier than the ready time trdy. If yes, in Step S524, the first vehicle PV executes a second corresponding operation, and then return to Step S502 to continue the process. If not, in Step S526, whether the ready time trdy is much earlier than the earliest time tfast is judged.

If the ready time trdy is much earlier than the earliest time tfast, in Step S528, the first vehicle PV executes a third corresponding operation, and then return to Step S502 to continue the process. If the ready time trdy is not much earlier than the earliest time tfast, in Step S530, the first vehicle PV executes a fourth corresponding operation, and then return to Step S502 to continue the process. Please refer to the following for the detailed description of the first to fourth corresponding operations.

The following embodiment is used to describe the first to fourth corresponding operations and the common road section operation.

Figure 6:
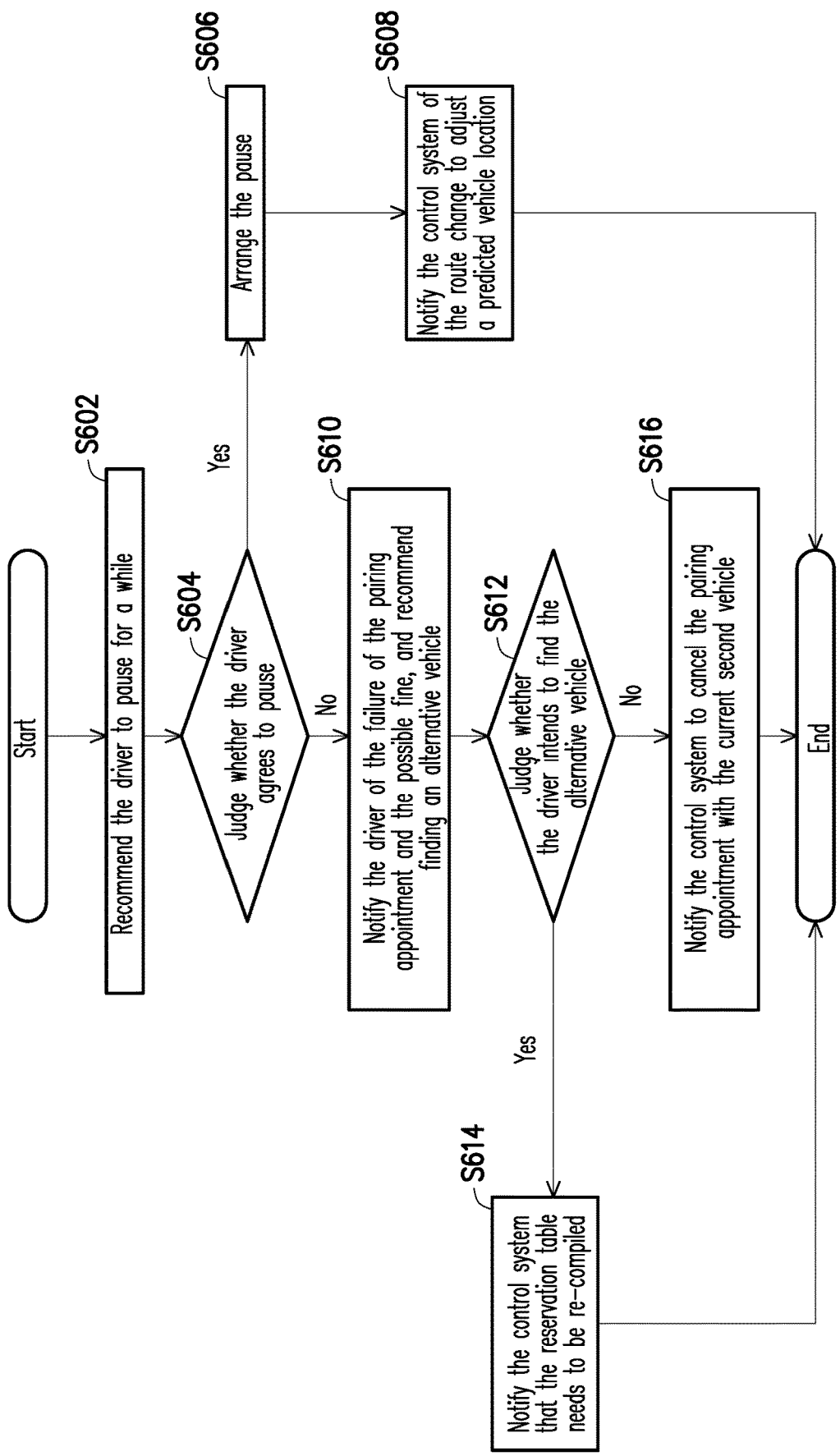
FIG. 6 is a flowchart of steps of a first corresponding operation according to an embodiment of the disclosure.

FIG. 6 is a flowchart of steps of a first corresponding operation according to an embodiment of the disclosure. Please refer to FIG. 6. The first corresponding operation is executed in a case where the latest time tslow is much earlier than the ready time trdy, that is, a case where the first vehicle PV is much earlier or faster than the second vehicle T.

First, in Step S602, the first vehicle PV recommends the driver D1 to pause for a while, otherwise the pairing appointment will fail because the second vehicle T will never catch up (if the driver D1 is too early due to the own mistake and the second vehicle T is travelling on time, the first vehicle PV will inform the driver D1 of the penalty).

Next, in Step S604, the first vehicle PV judges whether the driver D1 agrees to pause. If yes, in Step S606, the first vehicle PV arranges the pause (adjusts the route to a rest area or any other relay location), and then notifies the control system 100 of the route change in Step S608 to adjust a predicted vehicle location. If not, in Step S610, the first vehicle PV notifies the driver D1 of the failure of the pairing appointment and the possible fine, and recommends finding an alternative vehicle.

Next, in Step S612, the first vehicle PV judges whether the driver D1 intends to find the alternative vehicle. If yes, in Step S614, the control system 100 is notified that the reservation table needs to be re-compiled. If not, in Step S616, the control system 100 is notified to cancel the pairing appointment with the current second vehicle T.

Figure 7:
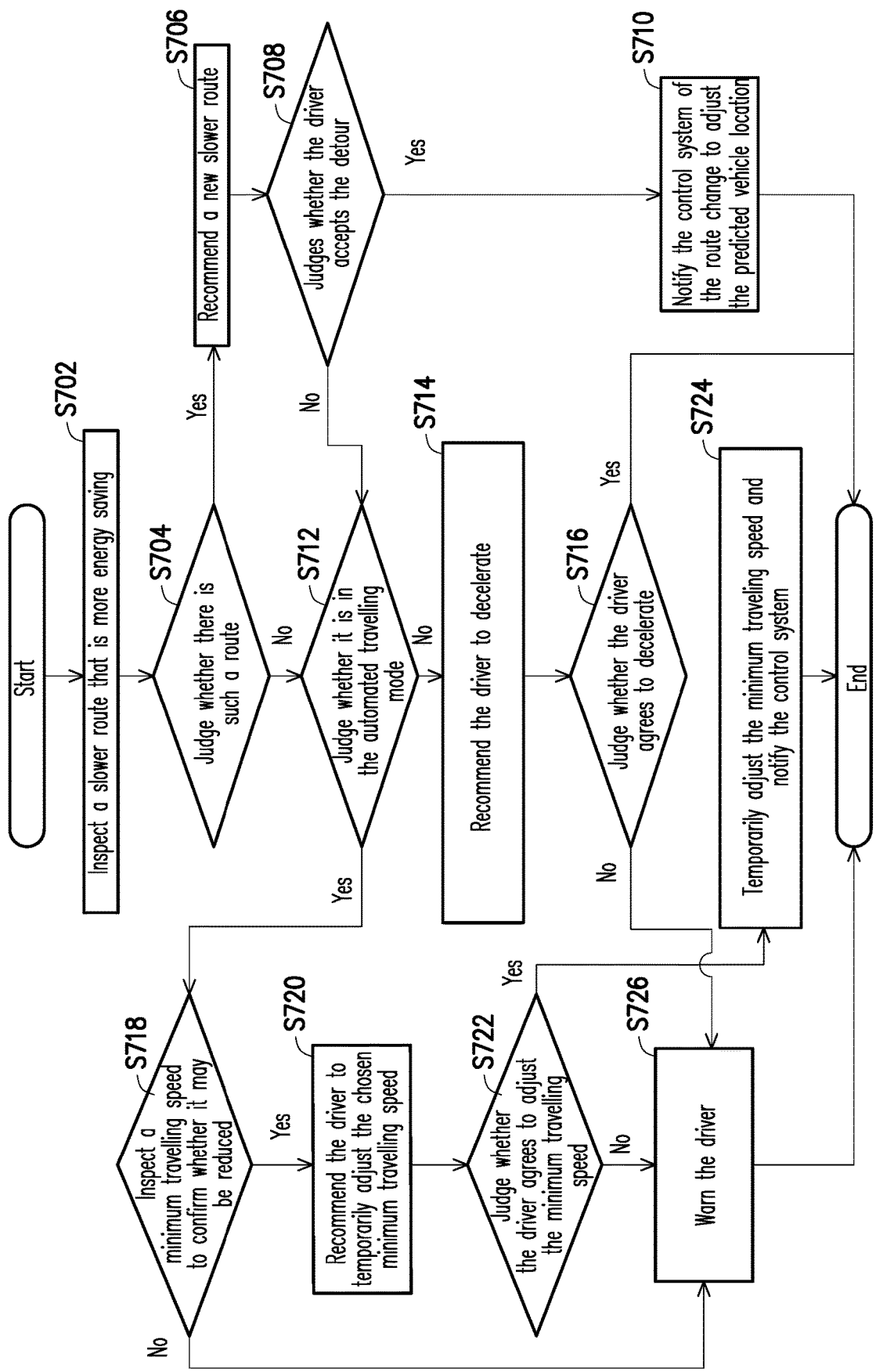
FIG. 7 is a flowchart of steps of a second corresponding operation according to an embodiment of the disclosure.

FIG. 7 is a flowchart of steps of a second corresponding operation according to an embodiment of the disclosure. Please refer to FIG. 7. The second corresponding operation is executed in a case where the latest time tslow is earlier than the ready time trdy, that is, the first vehicle PV is not much earlier or faster than the second vehicle T.

First, in Step S702, the first vehicle PV inspects a slower route that is more energy saving. Next, in Step S704, the first vehicle PV judges whether there is such a route. If yes, in Step S706, the first vehicle PV recommends a new slower route to the driver D1, and then in Step S708, the first vehicle PV judges whether the driver D1 accepts the detour. If the driver D1 accepts the detour, in Step S710, the first vehicle PV notifies the control system 100 of the route change to adjust the predicted vehicle location. If the driver D1 does not accept the detour, in Step S712, whether the first vehicle PV is in the automated travelling mode is judged.

If in Step S704, the first vehicle PV judges that there is no such route (slower route), directly proceed to Step S712 to judge whether the first vehicle PV is in the automated travelling mode. If not in the automated travelling mode, in Step S714, the first vehicle PV recommends the driver D1 to decelerate, and then in Step S716, the first vehicle PV judges whether the driver D1 agrees to decelerate. If the driver D1 agrees to decelerate, the method ends.

If the first vehicle PV is judged to be in the automated travelling mode in Step S712, the first vehicle PV inspects a minimum travelling speed to confirm whether the minimum travelling speed may be reduced in Step S718. If yes, in Step S720, the first vehicle PV recommends the driver D1 to temporarily adjust the chosen minimum travelling speed, and then in Step S722, whether the driver D1 agrees to adjust the minimum travelling speed is judged. If the driver D1 agrees to adjust the minimum traveling speed, the first vehicle PV temporarily adjusts the minimum traveling speed and notifies the control system 100 in Step S724. If the driver D1 does not agree to adjust the minimum traveling speed, the first vehicle PV warns the driver D1 that the pairing/charging time with the next second vehicle T may be shorter or may even be cancelled or fined in Step S726.

If the first vehicle PV judges that the driver D1 does not agree to decelerate in Step S716 or the first vehicle PV confirms that the minimum travelling speed cannot be reduced in Step S718, also directly proceed to Step S726 to warn the driver D1 that cancellation or fines may be imposed.

Figure 8:
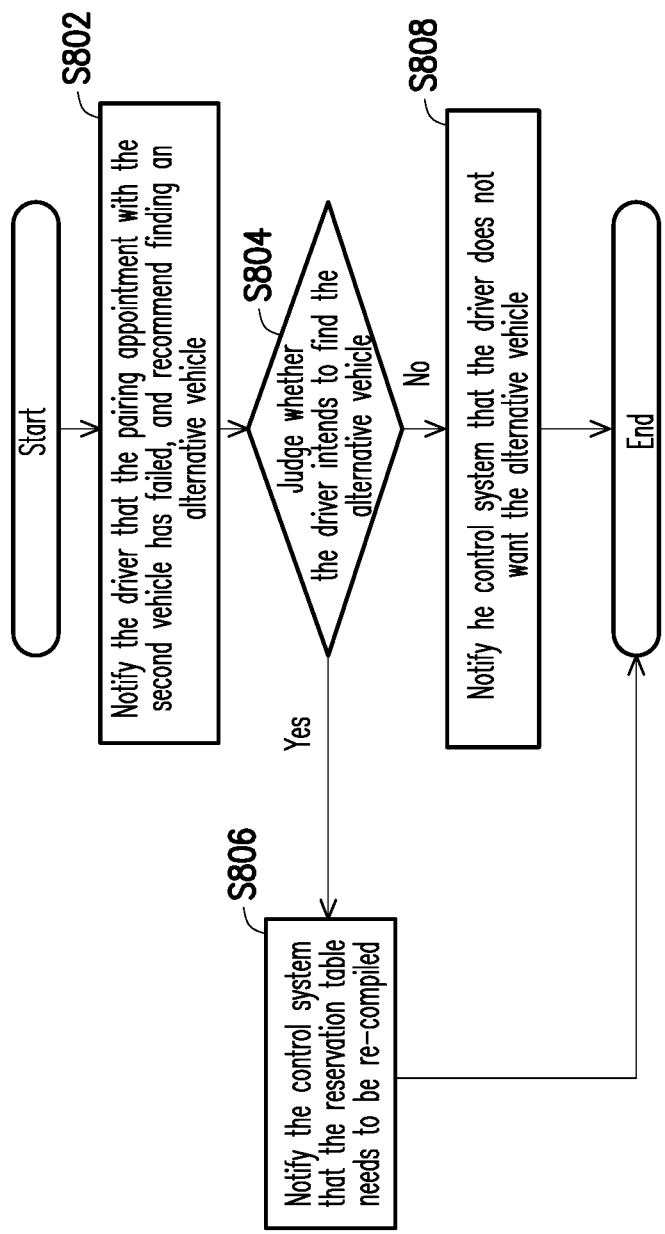
FIG. 8 is a flowchart of steps of a third corresponding operation according to an embodiment of the disclosure.

FIG. 8 is a flowchart of steps of a third corresponding operation according to an embodiment of the disclosure. Please refer to FIG. 8. The third corresponding operation is executed in a case where the ready time trdy is much earlier than the earliest time tfast, that is, the first vehicle PV is much later or slower than the second vehicle T.

First, in Step S802, the first vehicle PV notifies the driver D1 that the pairing appointment with the second vehicle T has failed because the first vehicle PV cannot catch up with the second vehicle T, and recommends finding an alternative vehicle (if the driver D1 is late due to the own mistake and the second vehicle T is travelling on time, the first vehicle PV will inform the driver D1 of the penalty).

Next, in Step S804, the first vehicle PV judges whether the driver D1 intends to find the alternative vehicle. If yes, in Step S806, the control system 100 is notified that the reservation table needs to be re-compiled. If not, in Step S808, the control system 100 is notified that the driver D1 does not want the alternative vehicle.

Figure 9:
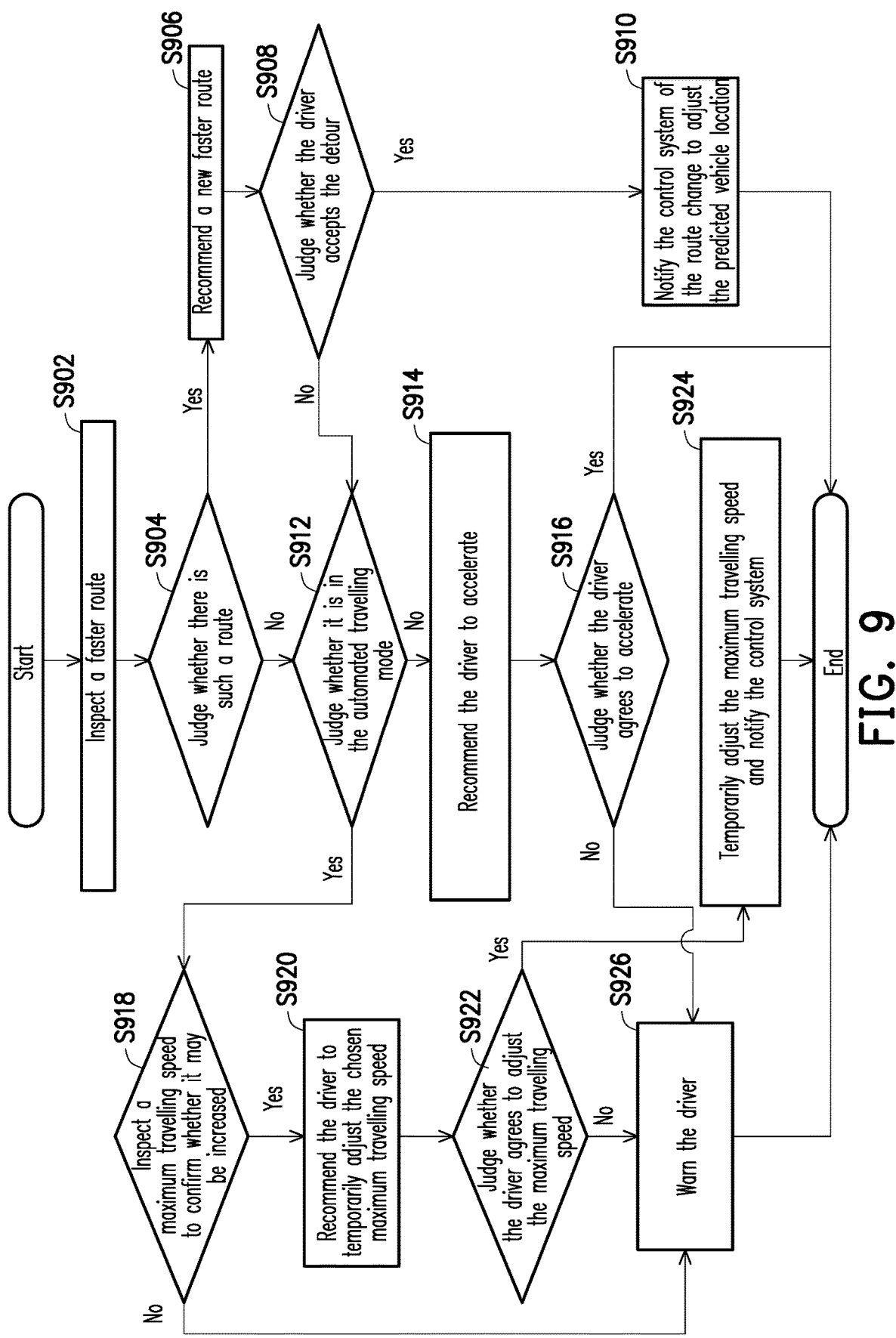
FIG. 9 is a flowchart of steps of a fourth corresponding operation according to an embodiment of the disclosure.

FIG. 9 is a flowchart of steps of a fourth corresponding operation according to an embodiment of the disclosure. Please refer to FIG. 9. The fourth corresponding operation is executed in a case where the ready time trdy is earlier than the earliest time tfast, that is, the first vehicle PV is not much later or slower than the second vehicle T.

First, in Step S902, the first vehicle PV inspects a faster route. Next, in Step S904, the first vehicle PV judges whether there is such a route. If yes, in Step S906, the first vehicle PV recommends a new faster route to the driver D1, and then in Step S908, the first vehicle PV judges whether the driver D1 accepts the detour. If the driver D1 accepts the detour, in Step S910, the first vehicle PV notifies the control system 100 of the route change to adjust the predicted vehicle location. If the driver D1 does not accept the detour, in Step S912, whether the first vehicle PV is in the automated travelling mode is judged.

If in Step S904, the first vehicle PV judges that there is no such route (faster route), directly proceed to Step S912 to judge whether the first vehicle PV is in the automated travelling mode. If not in the automated travelling mode, in Step S914, the first vehicle PV recommends the driver D1 to accelerate, and then in Step S916, the first vehicle PV judges whether the driver D1 agrees to accelerate. If the driver D1 agrees to accelerate, the method ends.

If the first vehicle PV is judged to be in the automated travelling mode in Step S912, the first vehicle PV inspects a maximum travelling speed to confirm whether the maximum travelling speed may be increased in Step S918. If yes, in Step S920, the first vehicle PV recommends the driver D1 to temporarily adjust the chosen maximum travelling speed, and then in Step S922, whether the driver D1 agrees to adjust the maximum travelling speed is judged. If the driver D1 agrees to adjust the maximum traveling speed, the first vehicle PV temporarily adjusts the maximum traveling speed and notifies the control system 100 in Step S924. If the driver D1 does not agree to adjust the maximum travelling speed, in Step S926, the first vehicle PV warns the driver D1 that the pairing/charging time with the next second vehicle T may be shorter or may even be cancelled or fined.

If the first vehicle PV judges that the driver D1 does not agree to accelerate in Step S916 or the first vehicle PV confirms that the maximum speed cannot be increased in Step S918, also directly proceed to Step S926 to warn the driver D1 that cancellation or fines may be imposed.

Figure 10:
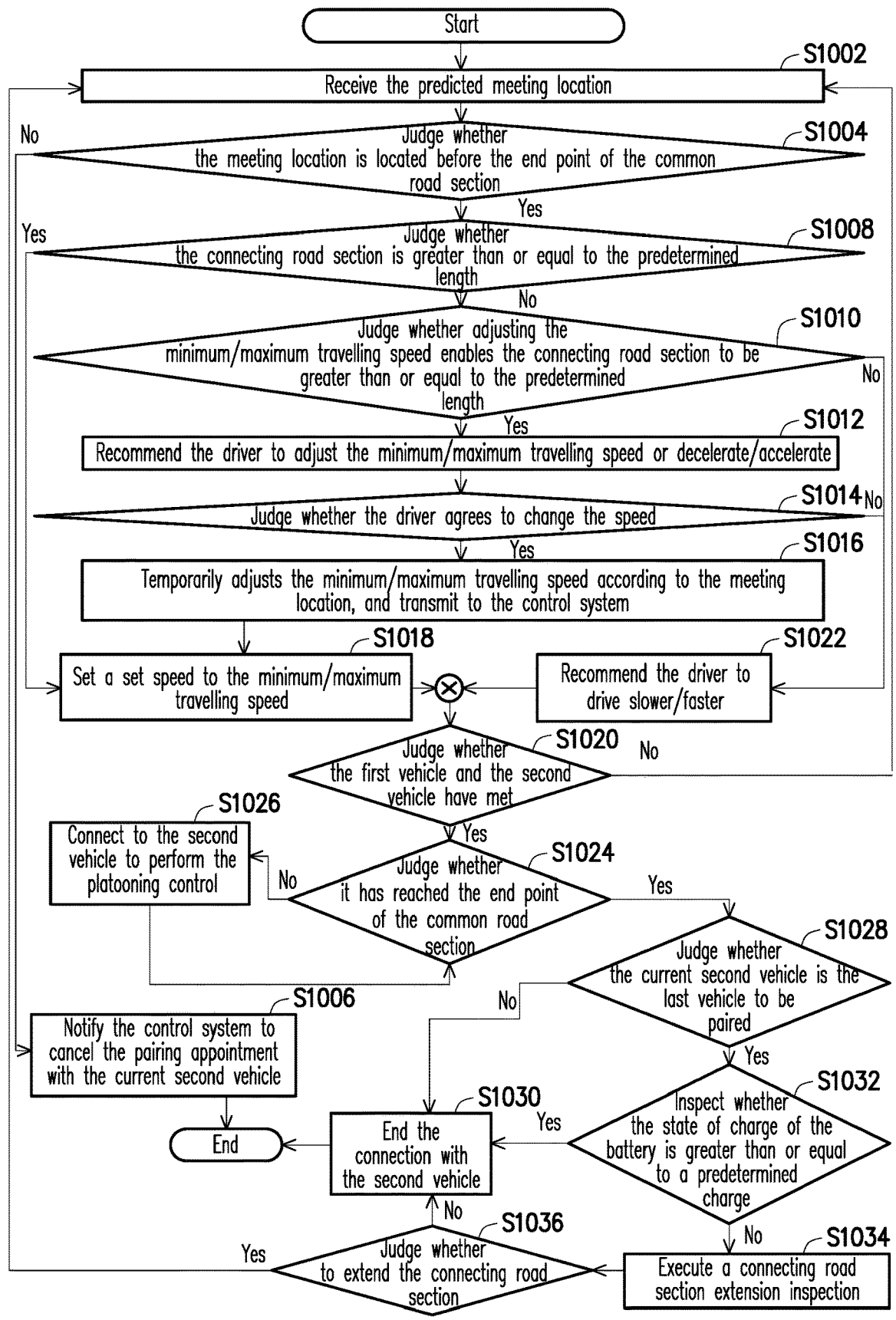
FIG. 10 is a flowchart of steps of a common road section operation according to an embodiment of the disclosure.

FIG. 10 is a flowchart of steps of a common road section operation according to an embodiment of the disclosure. Please refer to FIG. 10. First, in Step S1002, the matching component 132 of the control system 100 transmits the predicted meeting location where the first vehicle PV and the second vehicle T meet to the first vehicle PV, so that the first vehicle PV receives the predicted meeting location.

Next, in Step S1004, the first vehicle PV compares the meeting location with the end point of the common road section, and judges whether the meeting location is located before the end point of the common road section. If not, in Step S1006, the control system 100 is notified to cancel the pairing appointment with the current second vehicle T. If yes, in Step S1008, the first vehicle PV judges whether the connecting road section between the meeting location and the end point of the common road section is greater than or equal to the predetermined length.

If the connecting road section is not greater than or equal to the predetermined length, in Step S1010, the first vehicle PV judges whether adjusting the minimum/maximum travelling speed enables the connecting road section to be greater than or equal to the predetermined length. If yes, in Step S1012, the first vehicle PV recommends the driver D1 to adjust the minimum/maximum travelling speed (in the automated travelling mode) or recommends the driver D1 to decelerate/accelerate (in the manual driving mode).

Next, in Step S1014, the first vehicle PV judges whether the driver D1 agrees to change the speed. If yes, in Step S1016, the first vehicle PV temporarily adjusts the minimum/maximum travelling speed according to the meeting location, and transmits the adjusted vehicle speed to the matching component 132 of the control system 100. Next, a set speed is set to the minimum/maximum travelling speed in Step S1018, and proceed to Step S1020.

If in Step S1008, the first vehicle PV judges that the connecting road section between the meeting location and the end point of the common road section is greater than or equal to the predetermined length, proceed to Step S1018 to set the set speed to the minimum/maximum travelling speed according to the meeting location, and proceed to Step S1020.

If the first vehicle PV judges that adjusting the minimum/maximum travelling speed will not enable the connecting road section to be greater than or equal to the predetermined length in Step S1010 or if the first vehicle PV judges that the driver D1 does not agree to change the speed in Step S1014, the first vehicle PV recommends the driver D1 to drive slower/faster in Step S1022, and proceed to Step S1020.

In Step S1020, the first vehicle PV judges whether the first vehicle PV and the second vehicle T have met. If not, return to Step S1002 to continue the process. If yes, in Step S1024, the first vehicle PV judges whether the first vehicle PV has reached the end point of the common road section.

If the end point of the common road section is not reached, in Step S1026, the first vehicle PV is connected to the second vehicle T to perform the platooning control, and the second vehicle T may charge the first vehicle PV, and then return to Step S1024 to repeat the judgment until the end point of the common road section is reached.

If the end point of the common road section is reached, in Step S1028, the first vehicle PV judges whether the current second vehicle T is the last vehicle to be paired. If yes, in Step S1030, the first vehicle PV ends the connection with the second vehicle T. If not, in Step S1032, the first vehicle PV inspects whether the state of charge of the battery is greater than or equal to a predetermined charge. The predetermined charge may be formulated, for example, depending on the driving preferences of the driver D1.

If the state of charge is greater than or equal to the predetermined charge, in Step S1030, the first vehicle PV ends the connection with the second vehicle T. If the state of charge is not greater than or equal to the predetermined charge, in Step S1034, the first vehicle PV executes a connecting road section extension inspection to make a request to extend the connecting road section. Next, in Step S1036, whether to extend the connecting road section is judged. If yes, return to Step S1002 to continue the process. If not, in Step S1030, the first vehicle PV ends the connection with the second vehicle T.

Figure 11:
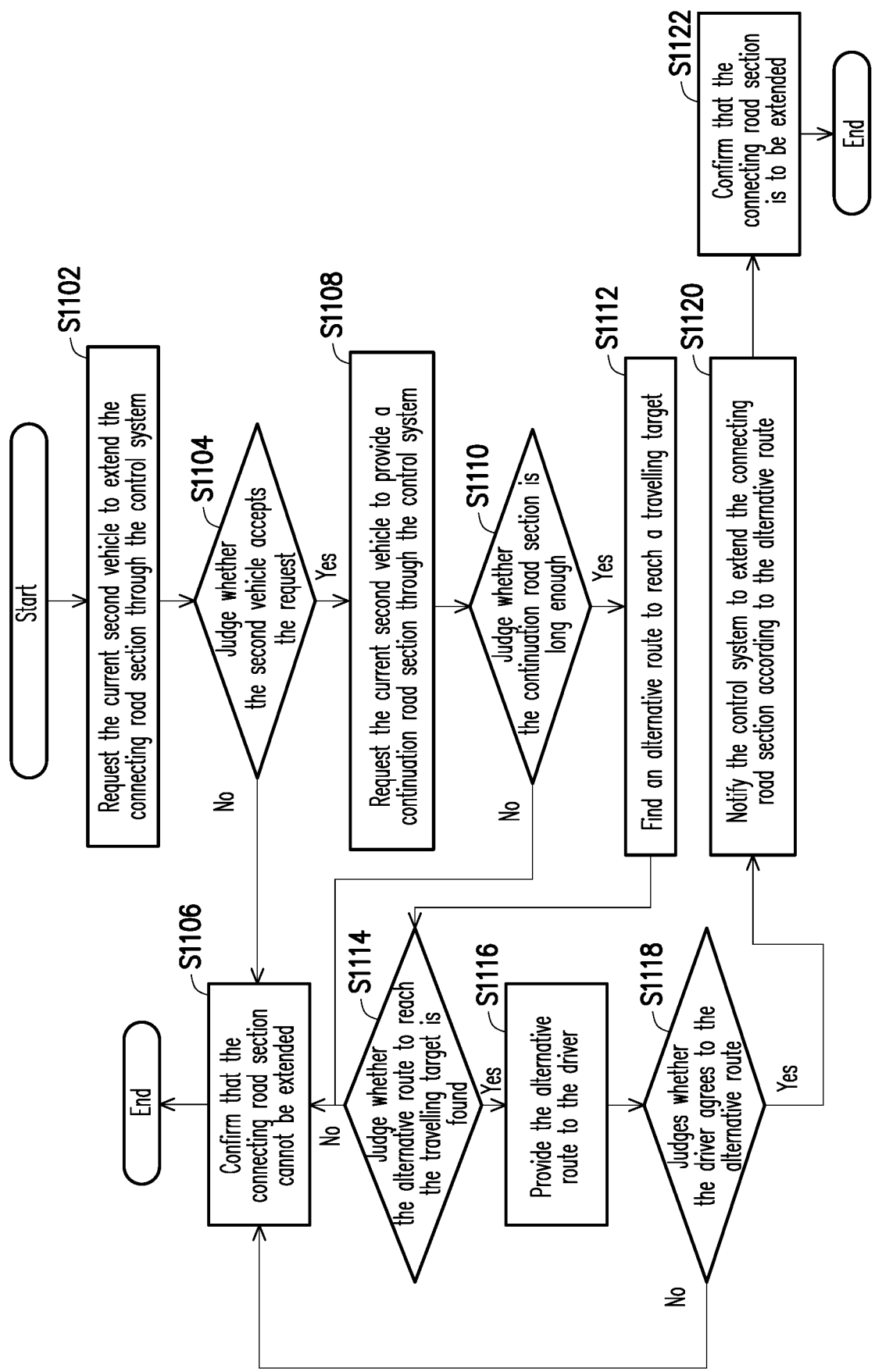
FIG. 11 is a flowchart of steps of a connecting road section extension inspection according to an embodiment of the disclosure.

The following example is used to describe the connecting road section extension inspection. FIG. 11 is a flowchart of steps of a connecting road section extension inspection according to an embodiment of the disclosure. Please refer to FIG. 11. First, in Step S1102, the first vehicle PV requests the current second vehicle T to extend the connecting road section through the control system 100 to continue charging. Next, in Step S1104, the first vehicle PV judges whether the second vehicle T accepts the request. If not, in Step S1106, the first vehicle PV confirms that the connecting road section cannot be extended. If yes, in Step S1108, the control system 100 requests the current second vehicle T to provide a continuation road section that may be connected for exchange or supplementation of electrical energy, and then in Step S1110, whether the continuation road section is long enough to significantly increase the charge of the battery of the first vehicle PV is judged. If the continuation road section is not long enough, in Step S1106, the first vehicle PV confirms that the connecting road section cannot be extended. If the continuation road section is long enough, in Step S1112, the first vehicle PV finds an alternative route to reach a travelling target. The alternative route is, for example, a route that can reach the required state of charge (or maximally increase the state of charge), but may cause a delay or a detour within the driving preferences of the driver D1. Also, the alternative route needs to contain the continuation road section.

Next, in Step S1114, the first vehicle PV judges whether the alternative route to reach the travelling target is found. If not, in Step S1106, the first vehicle PV confirms that the connecting road section cannot be extended. If yes, in Step S1116, the first vehicle PV provides the alternative route to the driver D1, and then in Step S1118, the first vehicle PV judges whether the driver D1 agrees to the alternative route.

If the driver D1 agrees to the alternative route, in Step S1120, the first vehicle PV notifies the control system 100 to extend the connecting road section according to the alternative route, so as to update the availability of the second vehicle T, and then in Step S1122, the first vehicle PV confirms that the connecting road section is to be extended.

If the driver D1 does not agree to the alternative route, in Step S1106, the first vehicle PV confirms that the connecting road section cannot be extended.

In summary, the control system of the vehicle of the disclosure can arrange in advance the pairing (charging) appointment to avoid the case of not being able to meet on the specified road section. The own vehicle can maximize the time for the platooning control with multiple large vehicles through operating manners corresponding to various situations. The large vehicle can maximize charging services to increase the income. In addition, the own vehicle may also request to extend the connecting road section in order to have the predetermined charge of the battery at the end of the trip itinerary. In this way, a long-term and stable pairing (charging) appointment can provide the most planning reliability for the drivers of both vehicles and provide the most profit potential for the back-end system.

Finally, it should be noted that the above embodiments are only used to illustrate, but not to limit, the technical solutions of the disclosure. Although the disclosure has been described in detail with reference to the above embodiments, persons skilled in the art should understand that the technical solutions described in the above embodiments can still be modified or some or all of the technical features thereof can be equivalently replaced. However, the modifications or replacements do not cause the essence of the corresponding technical solutions to deviate from the scope of the technical solutions of the embodiments of the disclosure.

What is claimed is:

1. A control system of a vehicle, comprising:
   a travelling plan database, stored with a future first travelling plan of a first vehicle and a plurality of future second travelling plans of a plurality of second vehicles, and disclosing the first travelling plan and the second travelling plans to a third party, wherein the first travelling plan and the second travelling plans respectively comprise a travelling date, a travelling time, and a travelling route;
   a long distance communication unit; and
   a control unit, coupled to the travelling plan database and the long distance communication unit, the control unit comprising:
   a matching component, querying the second vehicle that can be matched with the first vehicle to travel together on a specified road section with reference to travelling plans stored in the travelling plan database to compile a reservation table accordingly, and allowing a creator of the first travelling plan to perform platooning control on the specified road section according to the reservation table; and
   a pairing component, connecting the matched first vehicle and second vehicle through the long distance communication unit, so that the platooning control is performed,
   wherein the first vehicle comprises a vehicle-to-vehicle power receiving device, the second vehicle comprises a vehicle-to-vehicle power supplying device,
   when performing the platooning control, through connecting the vehicle-to-vehicle power receiving device and the vehicle-to-vehicle power supplying device, the second vehicle supplies power to the first vehicle.

2. The control system of the vehicle according to claim 1, wherein the control unit comprises:

a calculation component, calculating a reward for the second vehicle supplying power when performing the platooning control, and providing the reward to a driver of the second vehicle.

3. The control system of the vehicle according to claim 1, wherein the matching component respectively compares the first travelling plan with the second travelling plans to obtain a common road section between the first vehicle and the matched second vehicle.

4. The control system of the vehicle according to claim 3, wherein the matching component predicts an earliest time and a latest time for the first vehicle to reach a starting point of the common road section according to a driving preference of the first vehicle, and predicts a ready time for the second vehicle to reach the starting point of the common road section.

5. The control system of the vehicle according to claim 4, wherein when the ready time is between the earliest time and the latest time, the matching component associates information of the second vehicle with the common road section and adds the information to the reservation table indicating that the second vehicle can travel together with the first vehicle.

6. The control system of the vehicle according to claim 4, wherein when the ready time is earlier than the earliest time or later than the latest time, the matching component predicts a meeting location where the first vehicle and the second vehicle meet in a case of accelerating pursuit, and compares the meeting location with an end point of the common road section,
when the meeting location is located before the end point of the common road section and a connecting road section between the meeting location and the end point of the common road section is greater than or equal to a predetermined length, the matching component associates information of the second vehicle with the common road section and adds the information to the reservation table.

7. The control system of the vehicle according to claim 4, wherein after the first vehicle starts travelling on a day of a trip, the matching component transmits matching information of the second vehicle to be matched to the first vehicle according to the reservation table, the matching information comprises the starting point of the common road section, an end point of the common road section, the earliest time, the latest time, and the ready time with respect to the second vehicle to be matched,
the first vehicle judges whether the common road section is reached according to the matching information,
when the common road section is reached, the first vehicle executes a common road section operation to perform the platooning control,
when the common road section is not reached, the first vehicle executes a vehicle speed adjustment operation for accelerating or decelerating.

8. The control system of the vehicle according to claim 7, wherein when executing the common road section operation, the matching component transmits a predicted meeting location where the first vehicle and the second vehicle meet to the first vehicle, and the first vehicle compares the meeting location with the end point of the common road section,
when the meeting location is located before the end point of the common road section and a connecting road section between the meeting location and the end point of the common road section is greater than or equal to a predetermined length, the first vehicle sets a vehicle speed according to the meeting location.

9. The control system of the vehicle according to claim 8, wherein when executing the common road section operation, when the connecting road section is not greater than the predetermined length, the first vehicle temporarily adjusts the vehicle speed to lengthen the connecting road section, and transmits the adjusted vehicle speed to the matching component.

10. The control system of the vehicle according to claim 8, wherein when the common road section operation is performed, the first vehicle makes a request to extend the connecting road section according to a state of charge thereof.

11. The control system of the vehicle according to claim 1, wherein the reservation table comprises information of the plurality of second vehicles matched with the first vehicle and respective common road sections, and the matching component transmits the reservation table to a driver of the first vehicle to receive a reply to confirm whether the reservation table is established.

12. The control system of the vehicle according to claim 1, wherein in a case where the reservation table has already been established, when the travelling plan database receives a new second travelling plan having a new common road section with the first travelling plan, the matching component updates the reservation table according to the new second travelling plan.

13. The control system of the vehicle according to claim 1, wherein in a case where the reservation table has already been established, when the matching component is notified through the long distance communication unit that the first vehicle or the second vehicle associated with the reservation table cannot comply with a pairing appointment, the matching component re-compiles the reservation table with reference to the travelling plans stored in the travelling plan database.

14. The control system of the vehicle according to claim 1, wherein the control unit comprises:
a calculation component, calculating a penalty for the first vehicle or the second vehicle cancelling the appointment when the first vehicle or the second vehicle suddenly cancels a pairing appointment in a case where the reservation table is established to impose the penalty on a corresponding driver.

* * * * *